US011341017B1

(12) United States Patent
Cieslak et al.

(10) Patent No.: US 11,341,017 B1
(45) Date of Patent: May 24, 2022

(54) STAGED RELEASE OF UPDATES WITH ANOMALY MONITORING

(71) Applicants: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US); Olamide Valerie Olatunji, Los Angeles, CA (US); David Boyle, Santa Monica, CA (US); Claire Reinert, Seattle, WA (US)

(72) Inventors: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US); Olamide Valerie Olatunji, Los Angeles, CA (US); David Boyle, Santa Monica, CA (US); Claire Reinert, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 485 days.

(21) Appl. No.: 16/393,039

(22) Filed: Apr. 24, 2019

(51) Int. Cl.
*G06F 11/34* (2006.01)
*G06F 11/14* (2006.01)

(52) U.S. Cl.
CPC ...... *G06F 11/3423* (2013.01); *G06F 11/1479* (2013.01); *G06F 11/3495* (2013.01)

(58) Field of Classification Search
CPC ............ G06F 11/3423; G06F 11/3495; G06F 11/1479
USPC ......................................................... 702/186
See application file for complete search history.

(56) References Cited

U.S. PATENT DOCUMENTS

| 10,860,405 | B1* | 12/2020 | Zonneveld | .......... G06F 11/0709 |
| 10,936,462 | B1* | 3/2021 | Eardley | ................ G06F 11/076 |
| 2005/0159927 | A1* | 7/2005 | Cruz | .................. G06F 11/0748 |
| | | | | 702/188 |
| 2009/0217377 | A1* | 8/2009 | Arbaugh | ............... G06F 11/348 |
| | | | | 726/23 |
| 2015/0288557 | A1* | 10/2015 | Gates | ................. G06F 11/3082 |
| | | | | 714/37 |

(Continued)

*Primary Examiner* — James C Kerveros
(74) *Attorney, Agent, or Firm* — Culhane Meadows PLLC; Stephen J. Weed

(57) ABSTRACT

Systems, devices, media, and methods are presented for releasing an application feature in incremental stages while monitoring the application for anomalies. The feature includes a package of code and an action setting. The methods in some implementations include identifying active devices on which the application has been installed, monitoring the application according to a set of metrics, activating the feature by changing its action setting for a first segment of the active devices, pausing the feature if an anomaly is detected among the set of metrics, and generating a repair ticket. As long as no anomaly is detected, the activating step proceeds for subsequent segments of the active devices, iteratively, until the release is completed. A feature rank may be used to process and release a plurality of features in order of priority.

18 Claims, 5 Drawing Sheets

(56) References Cited

U.S. PATENT DOCUMENTS

| | | | |
|---|---|---|---|
| 2018/0267879 A1* | 9/2018 | Tsuda | G06F 11/3409 |
| 2019/0217777 A1* | 7/2019 | John Naum Vangelov | |
| | | | B60R 16/0231 |
| 2020/0409933 A1* | 12/2020 | Ertl | G06F 16/252 |
| 2021/0271582 A1* | 9/2021 | Liu | G06F 11/3428 |

* cited by examiner

STAGED RELEASE OF UPDATES WITH ANOMALY MONITORING

TECHNICAL FIELD

Examples set forth in the present disclosure relate generally to the release of application updates and features. More particularly, but not by way of limitation, the present disclosure addresses systems and methods for releasing updates and features in stages while monitoring the application for anomalies.

BACKGROUND

Software applications, including both desktop and mobile applications, typically require the periodic installation of updates. An update may include a software patch intended to fix or repair a bug or other defect, a general update with new or improved features, or an entirely new version of an application. Updates to mobile applications are often made available through an application distribution platform, or app store, that is accessible from mobile devices. A mobile application is designed to run on a portable mobile device such as a smartphone, tablet, watch, media player, camera, or headset. Many mobile applications are configured to allow independent software developers to create new or improved features that are specifically designed to work with or otherwise enhance the mobile application.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Various implementations and details are described with reference to an example: a release monitoring system for controlling the staged release of a mobile application feature, while simultaneously monitoring the application for anomalies. Each feature is released to a subset of devices, in incremental stages, until the release is completed, unless an anomaly is detected. If the system detects an anomaly among a set of metrics about the application, the system pauses or disables the feature and generates a repair ticket. The system may control the release of a plurality of features from an ordered list according to a rank associated with each feature. If a feature is paused or disabled, the system may proceed to select the next feature from the ordered list and process its release. In addition to the example release monitoring system, the systems and methods described herein may be applied to and used with any of a variety of systems, especially those for which high availability and precise control is desired.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

New or improved features become available for download frequently, especially for a popular or widely used mobile application. Some features are enabled, or turned on, as soon as the end user downloads the feature or updates the application. Updates and features sometimes cause application errors or other anomalies, which may cause inconvenience and irritation for end users. When application errors are observed after releasing an update or feature, the application's owner faces the difficult challenge of determining which feature is causing the errors. Searching for a solution is time consuming, labor intensive, and expensive because the search effort may include sending custom queries to gather data about the errors, evaluating the data, and reviewing the incoming error reports to try and identify the feature causing the errors.

Figure 1:
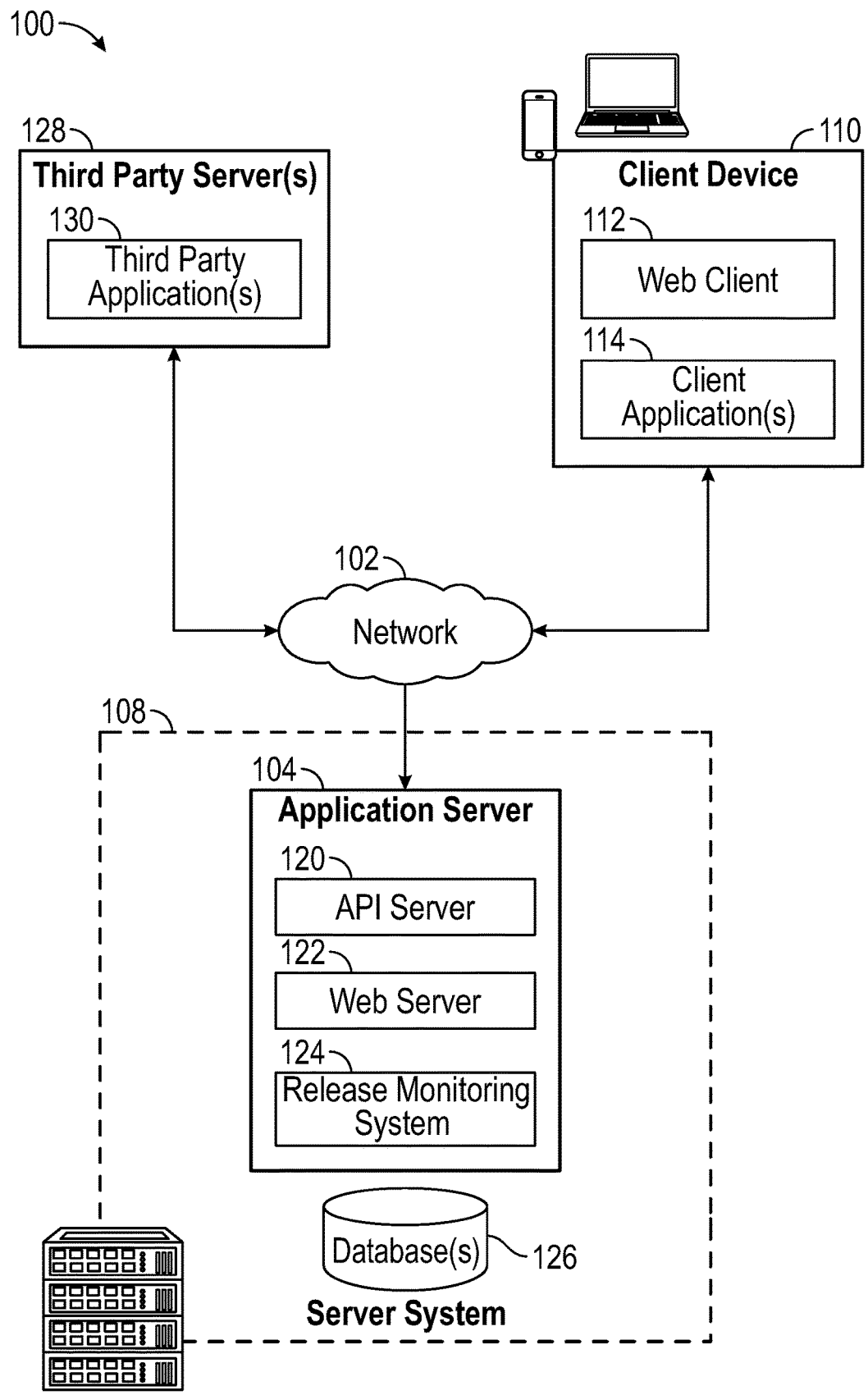
FIG. 1 is a block diagram showing an example release monitoring system over a network.

FIG. 1 is a block diagram illustrating a system 100, according to some examples, configured to automatically control the release of a new or improved feature. The system 100 includes one or more client devices such as client device 110. The client device 110 may include, but is not limited to, a mobile phone, desktop computer, laptop, portable digital assistant (PDA), smart phone, tablet, Ultrabook, netbook, laptop, multi-processor system, microprocessor-based or programmable consumer electronic device, game console, set-top box (STB), computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform. For example, the client device 110 may be used to open an application, to input information and create an account, and to execute any of a variety of application-driven tasks such as capturing images, creating and sending content, receiving and viewing content from others, and so forth.

For example, client device 110 is a device of a given user who would like to create an account on an online social platform. Client device 110 accesses a website of an online social platform (e.g., hosted by server system 108). The user inputs login credentials associated with the user. Server system 108 receives the request and provides access to the online social platform.

As another example, client device 110 is a device that downloads an update from an application distribution platform for an application, such as an online social platform hosted by server system 108. The update includes a feature having an action setting that has been changed from Disable to Enable by the server system 108, which also monitors the performance and other metrics associated with the application. In use, the feature has a defect that causes the application to crash or exhibit some other anomaly. In response, the server system 108 changes the action setting from Enable to Pause (or to Disable) for the client device 110 as well as other devices 110 using the application, until the feature defect can be repaired or otherwise corrected.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMAX network, a broadband cellular network (e.g., 3G, 4G, 5G, and the like) operated according to the LTE standard or otherwise, another type of network, or a combination of two or more such networks.

The client device 110 may access the various data and applications provided by other entities in the system 100 via web client 112 (e.g., a browser) or one or more client applications 114. The client device 110 may include one or more client application(s) 114 (also referred to as "apps") such as, but not limited to, a web browser, messaging application, electronic mail (e-mail) application, an e-commerce site application, a mapping or location application, an online home buying and selling application, a real estate application, and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

A server system 108 provides server-side functionality via the network 102 (e.g., the Internet or wide area network (WAN)) to: one or more third party server(s) 128, and one or more client devices 110). The server system 108 includes an application server 104 including an application program interface (API) server 120, a web server 122, and a release monitoring system 124, that may be communicatively coupled with one or more database(s) 126. The one or more database(s) 126 may be storage devices that store data related to (a) users of the server system 108, (b) applications associated with the server system 108, (c) cloud services, (d) data, identifiers, settings, and other characteristics associated with updates and features, and (e) any of a variety of other types of data. The one or more database(s) 126 may further store information related to third party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application, in one example.

The server system 108 in some implementations includes a release monitoring system 124 that may be associated with a cloud-based application. The release monitoring system 124 may obtain user data, event logs, system metrics, data about updates and features, and the like, which are associated with a particular application, such as an online social platform, from the one or more databases 126, as described herein.

The system 100 further includes one or more third party server(s) 128. The one or more third-party server(s) 128 may include one or more third party application(s) 130. The one or more third party application(s) 130, executing on third party server(s) 128 may interact with the server system 108 via API server 120 via a programmatic interface provided by the API server 120. For example, one or more the third-party applications 132 may request and utilize information from the server system 108 via the API server 120 to support one or more features or functions on a website hosted by the third party or an application hosted by the third party. The third-party application(s) 130, for example, may provide software version analysis functionality that is supported by relevant functionality and data in the server system 108.

Figure 2:
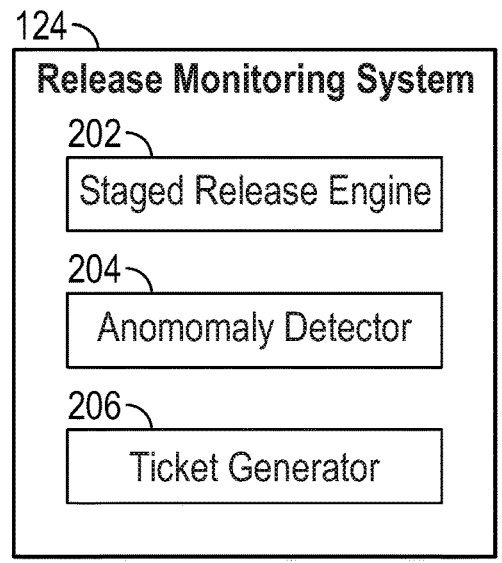
FIG. 2 is a block diagram of the release monitoring system of FIG. 1, in accordance with some example implementations.

FIG. 2 is a block diagram of an example release monitoring system 124. The release monitoring system 124 includes a staged release engine 202, an anomaly detector 204, and a ticket generator 206. The staged release engine 202 is implemented in the application server 104 and is configured to engage a monitoring operation, release a feature in incremental stages, and pause or disable the release in response to a detected anomaly. The release engine 202 in some implementations controls a plurality of features, stored by rank in an ordered list or database. The anomaly detector 204 is implemented in the server 104 and is configured to evaluate a set of metrics about the application and its operation as gathered by the monitoring operation and, when an anomaly is detected, to direct the staged release engine 202 to Pause or Disable the release. The release engine 202 pauses the feature in order to minimize application crashes or other interruptions related to the anomaly. If no anomaly is detected, the release proceeds in stages until completed. After a release is completed, in implementations where the release engine 202 controls a plurality of features, stored by rank in an ordered list, the release engine 202 selects and executes the staged release of the next feature in the list. The ticket generator 206 is implemented in the server 104 and is configured to generate and send a repair ticket to the developer or team responsible for the feature that caused the anomaly. The ticket may include a message, a priority for the action, and any of a variety of data about the anomaly detected.

Although the one or more flowcharts may depict the operations as a sequential process, many of the operations can be performed in parallel or concurrently. In addition, the order of the operations may be rearranged. A process is terminated when its operations are completed. The term process may correspond to method, procedure, and the like. The steps of a process or method may be performed in whole or in part, may be performed in conjunction with some or all of the steps in the same or other methods, and may be performed by or in conjunction with any of a variety of different systems, such as the systems described herein.

Figure 3:
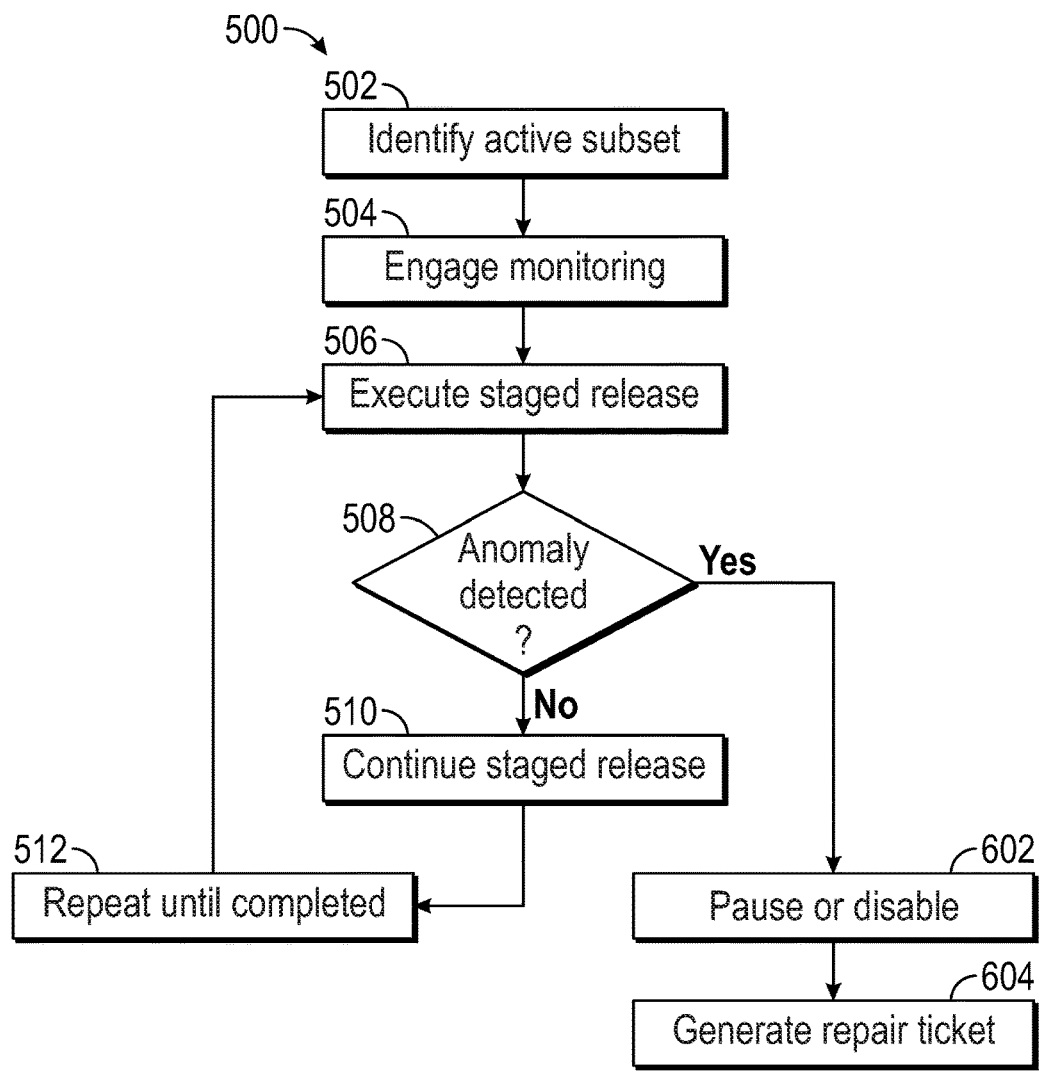
FIG. 3 is a flow diagram illustrating an example method of activating the release of a feature while monitoring the application for anomalies, in accordance with some example implementations.

FIG. 3 is a flow diagram illustrating an example method of activating the release of a feature while monitoring the application for anomalies, in accordance with some example implementations. The feature may include a package of code and an action setting. The feature may also include a unique identifier and a rank. These and other characteristics of the feature may be organized and stored in one or more databases 126.

As used herein, the feature may be an entirely new feature or include improvements or updates to an existing feature. The feature may be one developed by the owner of the application or by a third-party developer with access to a toolkit, instructions, guidelines, a portal, or other resource for use when developing compatible features.

The unique identifier may include a number, code, or other indicia unique to each particular feature in order to differentiate it from other features.

The rank associated with each feature may indicate its priority relative to other features. The rank of a feature that includes a security fix, for example, may be higher than the rank for a less important feature. The rank may also be used to define an order of release for a set of features in which one must be installed before the others, in an ordered list. Any of a variety of criteria, ranging from importance or urgency to mere convenience or no reason at all, may be used to assign a rank to a feature. The ranks assigned to a set of features creates a stack rank (0, 1, . . . n) which the system may use to access, prepare, release, or otherwise process the features in rank order.

The set of possible action settings may include Disable, Enable, and Pause. In some implementations, Disable is the default action setting for a new or improved feature when it is received from a developer for review. For example, a proposed feature may have an action setting of Disable until the feature is reviewed and approved. The setting for the feature may remain on Disable until features having a higher rank are processed by the system. For example, according to rank, the system may activate the feature by changing its action setting from Disable to Enable. If an anomaly is detected, for example, the action setting may be changed to Disable or to Pause.

The Disable setting, in some implementations, stops the release of the feature permanently; until the feature can be repaired or re-designed. In some implementations, the Disable setting includes a rollback; that is, the Disable setting stops uses of the feature on some or all devices, including devices that may have downloaded and briefly used the feature.

The Pause setting is especially useful for features that, once enabled, cannot be disabled without adverse consequences to the functioning or operation of the application. In some implementations, the Pause setting stops the release of the feature temporarily; until the feature can be repaired. In some implementations, the Pause setting stops the release of the feature and also stops the release of any additional features in a list. This action is particularly useful when a series of features are interdependent; for example, when the successful release of a first feature is a prerequisite for the release of a second feature.

Referring to FIG. 3, the method 500 in some implementations starts when the release monitoring system 124 performs the step of identifying an active subset of devices, at operation 502. The active subset may be defined to include all the devices that have installed the application (in other words; all the devices of registered users of the application), whether currently running the application or not. Alternatively, the release monitoring system 124 may be configured to actively monitor the current status of certain device types (certain Samsung models, for example); in this example, the active subset may be defined to include the monitored devices that are currently running the application. At operation 504, the system 124 engages the monitoring of the active subset of devices. Monitoring of the application may be already in progress, using any of a variety of real-time application performance monitoring tools. For the present method 500, in various implementations, the monitoring 504 may be accomplished according to a set of metrics associated with the health or functioning of the application, including for example a performance metric and an engagement metric.

At operation 506, the staged release engine 202 of the release monitoring system 124 begins a staged release of a selected feature, by activating the action setting from Disable to Enable for that feature, on particular devices. In some implementations, the activating step applies to a first segment of the active subset of devices. The first segment of devices, for example, may be defined as a percentage of the active subset of devices. As devices stop and start running the application, the devices belonging to the active subset (in some implementations) may change over time; however, the feature may remain enabled for any device that received the action setting of Enable from the system.

The first segment may be configured as a variable setting in the release monitoring system 124. The first segment, for example, may be set to about one percent (1%) of the active subset of devices. In this aspect, the release of the feature to users begins relatively slowly, by activating the Enable action setting for only one out of every one hundred active devices. The first segment may be expressed as a percentage, a quantity, or any other value associated with the population of devices on which the application has been installed. The first segment may be associated with all the features to be released or a subset thereof. For example, when a feature is known to be simple with a low risk of causing errors, the first segment may be set to about fifty percent (or higher) of the active subset of devices for that feature. Similarly, for a newly created feature about which little is known, the first segment may be set to about one percent (1%) (or lower) of the active subset. The setting for the first segment may be associated with the unique identifier for that feature.

While the release of a feature is proceeding in stages, the anomaly detector 204 is configured to continually evaluate (at operation 508) a set of metrics about the application, as gathered by the monitoring process 504. If and when an anomaly is detected, the anomaly detector 204 may direct the staged release engine 202 to Pause or Disable the release. At operation 602, the pause is accomplished by changing the action setting for the feature from Enable to Pause. For example, if application crashes are detected among the active subset of devices, then the system 124 will Pause the feature (at operation 602) to prevent further crashes. The action setting of Pause will, in some implementations, temporarily halt uses of the feature without disabling the feature. In this aspect, the Pause setting is useful for features that, once enabled, cannot be disabled without adverse consequences to the application.

At operation 604, in some implementations, the ticket generator 206 generates and sends a repair ticket to the developer or team responsible for the feature that caused the anomaly. The repair ticket may include a message, a priority for the action, and any information that may be known or gathered about the feature defect, the anomaly that occurred, and other circumstances related to the anomaly.

The action setting is persistent in some implementations. For example, the action setting of Pause may remain associated with the feature unless and until a subsequent event occurs to change the action setting. When the feature has been repaired, reviewed, and approved, for example, the release monitoring system 124 may be configured to change the action setting from Pause to Enable, thereby placing the repaired feature back into the ordered list of features to be released using the activating step, at operation 506.

When the release monitoring system 124 is processing a number of features in an ordered list, and a feature is Paused, the system 124 may execute a return or repeat step (not shown) and select the next feature, according to rank, and then perform the activating step at operation 506 for the next feature. In this aspect, the system 124 is configured to continue releasing additional features while an anomaly-related feature has been paused.

If no anomaly is detected among the first segment of active devices, then the system 124 at operation 510 will continue the release of the feature in incremental stages. In the flowchart shown in FIG. 3, the staged release will repeat until completed, at operation 512. At operation 506, the staged release engine 202 will perform the step of updating the action setting from Disable to Enable for a subsequent segment of active devices. In this aspect, the operations 510, 512, and 506 may continue the process of updating the action setting to Enable for another subsequent segment of devices, iteratively, until the feature is installed on substantially all devices in the active subset. For example, the subsequent segment may be configured as a variable setting (like the first segment) and set to about ten percent (10%) of the active subset of devices. Iterations of the activating step would be executed, adding ten percent of the devices for each iteration, as long as no anomaly is detected, until the feature is installed on substantially all devices in the active subset.

The subsequent segment may be set to the same percentage or quantity for each iteration (ten percent, for example). Alternatively, the subsequent segment may be set to a number of different percentages or quantities for each iteration, to be executed in order. For example, the activating step at operation 510 may be executed by iteratively increasing the subsequent segment so that the subtotal quantity of devices with the feature Enabled equals (1) in a first iteration, about ten percent (10%) of said the subset; (2) in a second iteration, about thirty percent (30%) of the active subset; (3) in a third iteration, about seventy percent (70%) of the active subset; and, finally (4) in a fourth iteration, about one hundred percent (100%) of the active subset or, in other words, substantially all devices in the active subset. Upon completion, the release monitoring system 124 is configured to select the next feature, according to rank, and then perform the activating step at operation 506 for the next feature. In this aspect, the system 124 is configured to continue installing features, in rank order.

Referring again to FIG. 3, operation 504 includes the step of engaging the monitoring of the active subset of devices. The method 500 in some implementations also includes an additional step of detecting a feature subset which, as defined, would include devices on which the action setting is currently Enable for the particular feature being released. In this detecting step, not shown, the system 124 may detect whether a feature has been Enabled on the device by inspecting the current version of configurations being used by the application. The configurations may be mapped to a list of Enabled features. The step of monitoring at operation 504 in this implementation may include monitoring the feature subset according to a set of metrics. In this aspect, the release monitoring system 124 may be directed at the particular devices on which the feature undergoing release has been set to Enable.

The step of changing the action setting from Enable to Pause for the feature, at operation 602, according to some implementations includes the additional step of changing the action again from Pause to Disable. While some features cannot be fully disabled without adverse consequences to the application as a whole, there are features which can be turned off entirely using the action setting of Disable. For example, the Disable setting may be suitable for a feature that might be described as incidental or non-essential to the operation of the application itself. Whether the system 124 executes this additional step may be based on the unique identifier associated with the feature. For example, the unique identifier may include a number, code, or other indicia suggesting that the feature may be Disabled without adverse consequences to the application.

As shown in FIG. 3, following a Disable setting, the system 124 may generate a repair ticket at operation 604. The action setting of Disable in some examples is persistent; meaning the setting of Disable will remain associated with the feature unless and until a subsequent event occurs to change the action setting. When the feature has been repaired, reviewed, and approved, for example, the release monitoring system 124 may change the action setting from Disable to Enable, thereby placing the repaired feature back into the ordered list of features to be released using the activating step, at operation 506.

The method 500 may also include an initial step of uploading the feature (not shown) to an application distribution platform (known colloquially as an app store). In this implementation, the release monitoring system 124 may detect the quantity of downloads executed for a particular feature. In this aspect, the system 124 can determine if the feature has been downloaded to a number of devices that is large enough to produce reliable data when monitoring starts, at operation 504. The threshold limit may be configured as a variable setting; either for all features or a subset thereof. For example, a threshold limit may be set for a particular feature. When the quantity reaches or exceeds a threshold limit, the release monitoring system 124 may be configured to start the process at operation 502 for this particular feature and/or to add this particular feature to an ordered list, by rank, of a plurality of features.

Each operation or step in the method 500 which has been described for handling a single feature may be accomplished for a set of features. In this aspect, the method 500 may include the step of maintaining an ordered list of a plurality of features, in which each feature is placed in order according to its rank. In operation, the features may be activated, according to the ordered list, by executing the activating step, at operation 506.

Referring again to operation 504, the monitoring may be accomplished according to a set of metrics associated with the health or functioning of the application, including for example a performance metric and an engagement metric. Each metric may be assigned a priority; for example, the performance metric may be weighted to reflect that it is more important than the engagement metric. The set of metrics may be the same or similar for all features or for a subset thereof.

The performance metric in some implementations involves a number of different measurements related to how the application is performing, including crash rate, app-open latency, and task latency. In some implementations, each measurement may be assigned a priority, such that the system applies a different weight or importance to one metric over another (crash rate, for example, may be assigned a higher priority that task latency). The term 'crash' refers to incidents when the application crashes; that is, stops functioning and freezes or closes. The term 'crash rate' refers to a number of crash incidents in relation to a duration of time (crashes per second), to a number of active applications (crashes per hundred active instances), or another relevant quantity. The app-open latency is associated with the duration between starting and completing the application opening process. A relatively long app-open latency may indicate poor performance. Similarly, the task latency is associated with the duration between starting and completing a particular task. A relatively long task latency may indicate poor performance. The system may measure the task latency associated with a selected task, such as a capture task (taking a photograph, for example), a send task (preparing and transmitting a message or other information), or another task selected based on the extent to which it might reflect the overall performance of the application.

The engagement metric in some implementations involves a number of different measurements related to how deeply users are engaged with the application, including session length and the number or quantity of actions or tasks completed. In some implementations, each measurement may be assigned a priority, such that the system applies a different weight or importance to one metric over another (session length, for example, may be assigned a higher priority that the quantity of user actions). Session length relates of course to the duration of time between opening and closing an application. The quantity of user actions may be counted, during a time period and/or during one session or several sessions. The system may count the occurrences of any of a variety of user actions, including for example a creation action (composing an image, for example), a send action (preparing and sending a message of other data), or another action selected based on the extent to which the activity might reflect the overall engagement with of the application.

The monitoring operation 504 as described herein is performed in order to detect an anomaly, if present, among the set of metrics. The term anomaly refers to any metric or measurement that deviates from what is standard, normal, or expected.

In some examples, the anomaly detector 204 of the release monitoring system 124 is configured to assess the presence or absence of an anomaly in relation to one or more stability thresholds. The stability threshold may be configured as a variable setting; either for all features or a subset thereof. For example, for a performance metric that includes a crash rate, the anomaly detector 204 may include a stability threshold expressed as the number of crashes per minute. As long as that stability threshold is not exceeded, there is no anomaly. If and when that stability threshold is exceeded, then an anomaly is present according to the anomaly detector 204. The stability threshold may be expressed in any of a variety of ways that are especially probative regarding a particular metric. For example, the stability threshold in the example above is expressed as 'number of crashes per minute.' Other expressions may include a system-wide crash rate such as a percentage of active applications, a quantity of crashes detected during a time period immediately following the step of activating a feature, and the like. The expression developed for a stability threshold will of course vary depending on the metric. The stability threshold for app-open latency, for example, may be expressed as a number of latencies exceeding a time limit (300 milliseconds, for example), an average of the measured latencies for a particular number of application instances, and the like.

In a related aspect, the one or more stability thresholds implemented by the anomaly detector 204 may include an absolute threshold and a relative threshold, along with rules expressing the relationship between them. An absolute threshold may be expressed as a quantity, a rate, a rate of change, and the like. For example, an absolute threshold associated with a crash rate metric may be set at 'eighty crashes per minute.' If that metric reaches the absolute threshold, an anomaly is present. A relative threshold, in contrast, may be expressed as a quantity or rate relative to another selected quantity or rate. For example, a relative threshold associated with a crash rate metric may be set at 'a fifty percent increase in crash rate per minute when the feature is enabled, relative to the crash rate per minute during the ten minutes immediately before the feature was enabled.' If the relative threshold is exceeded for that metric, then an anomaly is present.

For a metric that includes both an absolute threshold and a relative threshold, the anomaly detector 204 may also include a rule for determining when an anomaly is present. For example, the anomaly detector 204 may be configured to determine an anomaly exists when the metric meets or exceeds either threshold or both thresholds. Alternatively, the rule may require the anomaly detector 204 to evaluate one threshold first, before evaluating the other threshold.

Figure 4:
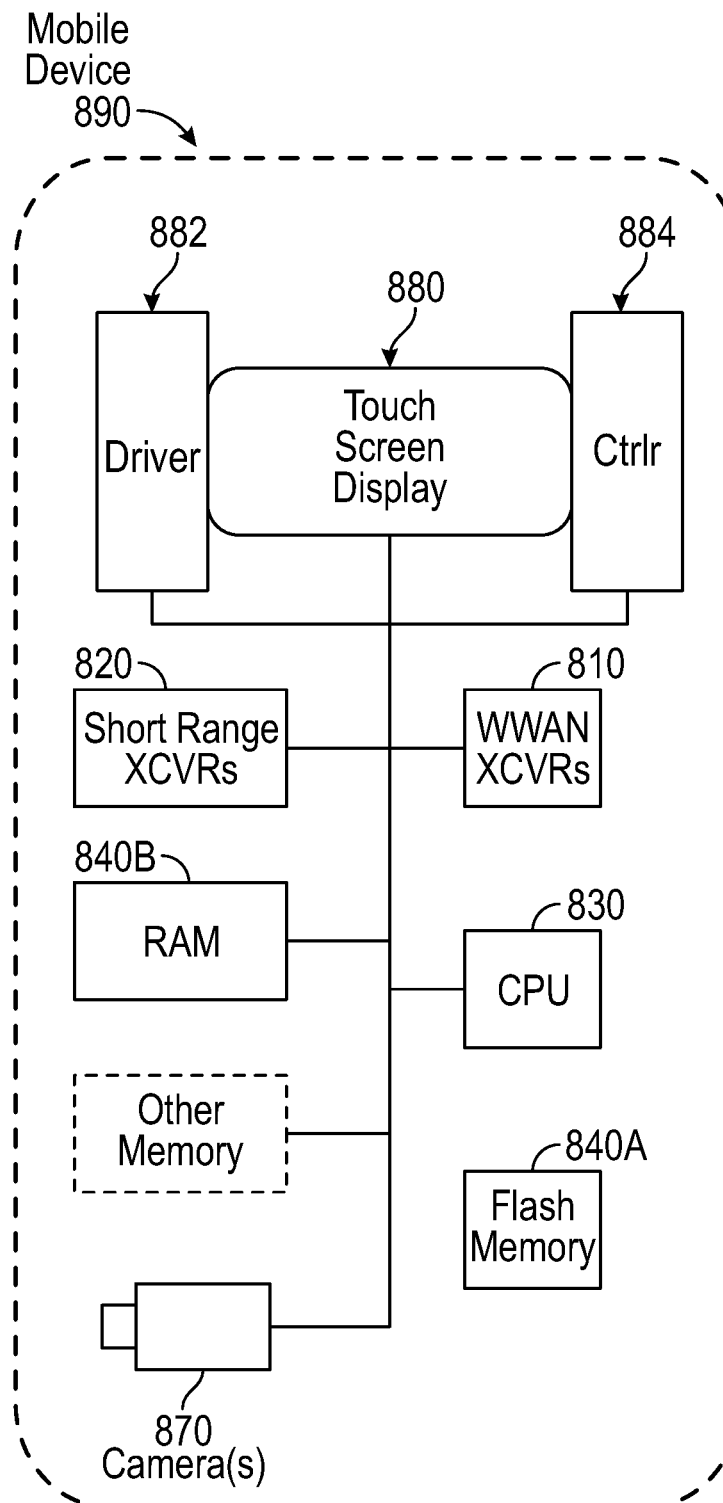
FIG. 4 is a diagrammatic representation of an example hardware configuration for a client device embodied as a mobile device.

FIG. 4 is a high-level functional block diagram of an example client device 110 embodied as an example mobile device 890. Mobile device 890 includes a flash memory 840A which includes programming to perform all or a subset of the functions described herein. Mobile device 890 can include a camera 870 that comprises at least two visible-light cameras (first and second visible-light cameras with overlapping fields of view) or at least one visible-light camera and a depth sensor with substantially overlapping fields of view. Memory 840A may further include multiple images or video, which are generated via the camera 870.

As shown, the mobile device 890 includes an image display 880, an image display driver 882 to control the image display 880, and a controller 884. In the example of FIG. 4, the image display 880 and a user input device are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 4 therefore provides block diagram illustrations of the example mobile device 890 having a touch screen display for displaying content and receiving user input as (or as part of) the user interface.

As shown in FIG. 4, the mobile device 890 includes at least one digital transceiver (XCVR) 810, shown as WWAN XCVRs, for digital wireless communications via a wide area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web-related inputs, and various types of mobile message communications to/from the mobile device 890.

The mobile device 890 further includes a microprocessor, shown as CPU 830, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 890 by configuring the mobile device 890 to perform various operations, for example, in accordance with instructions or programming executable by processor 830. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 890 includes a memory or storage device system, for storing data and programming. In the example, the memory system may include a flash memory 840A and a random-access memory (RAM) 840B. The RAM 840B serves as short term storage for instructions and data being handled by the processor 830, e.g., as a working data processing memory. The flash memory 840A typically provides longer term storage.

Hence, in the example of mobile device 890, the flash memory 840A is used to store programming or instructions for execution by the processor 830. Depending on the type of device, the mobile device 890 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Figure 5:
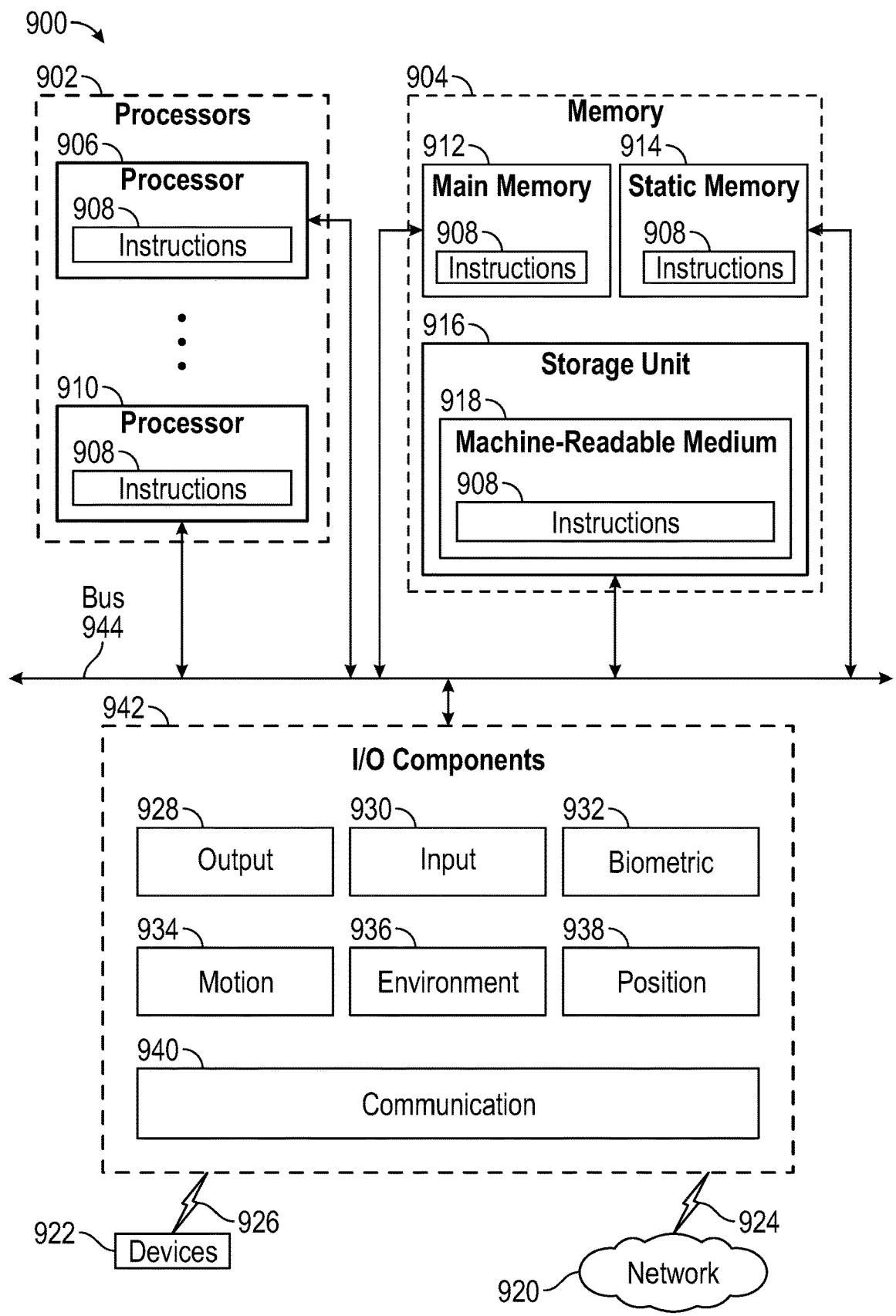
FIG. 5 is a diagrammatic representation of a machine in the form of a computer system within which a set of instructions may be executed for causing the machine to perform any one or more of the methodologies discussed herein, in accordance with some examples.

FIG. 5 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 5 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 5. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, a resistance feedback mechanism), other signal generators, and so forth. The input components 930 may include alphanumeric input components (e.g., a keyboard, a touch screen configured to receive alphanumeric input, a photo-optical keyboard, or other alphanumeric input components), pointing-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near-field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 6:
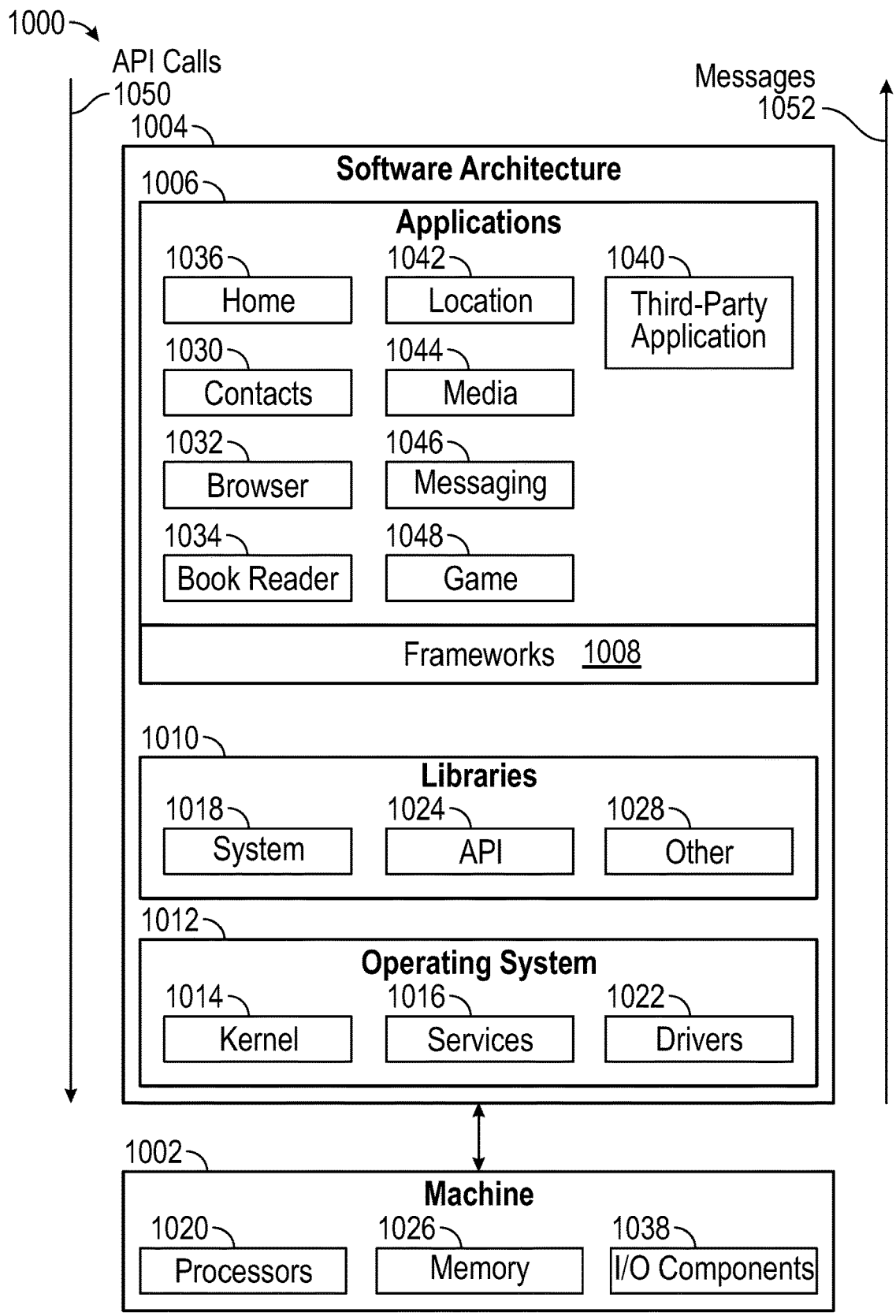
FIG. 6 is block diagram showing a software architecture within which the present disclosure may be implemented, in accordance with examples.

FIG. 6 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, Bluetooth® or Bluetooth® Low Energy (BLE) drivers, flash memory drivers, serial communication drivers (e.g., Universal Serial Bus (USB) drivers), Wi-Fi® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., a WebKit® engine to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The third-party applications 1006 are programs that execute functions defined within the programs. Various programming languages can be employed to create one or more of the applications 1006, structured in a variety of manners, such as object-oriented programming languages (e.g., Objective-C, Java, or C++) or procedural programming languages (e.g., C or assembly language).

In a specific example, the third-party application 1040 (e.g., an application developed using the Google Android or Apple iOS software development kit (SDK) by an entity other than the vendor of the particular platform) may be mobile software running on a mobile operating system such as Google Android, Apple iOS (for iPhone or iPad devices), Windows Mobile, Amazon Fire OS, RIM BlackBerry OS, or another mobile operating system. In this example, the third-party application 1040 can invoke the API calls 1050 provided by the operating system 1012 to facilitate functionality described herein.

What is claimed is:

1. A method of staging installation of a feature, said method comprising:
    on a first computing device in communication with a plurality of remote computing devices maintaining a feature associated with an application, wherein said features comprises a package of code and an action setting, said action setting comprising an action selected from the group consisting of Disable, Enable, and Pause;
    monitoring, by said first computing device, an active subset of said plurality of remote computing devices running said application according to a set of metrics associated with said application;
    activating installation of said feature from said first computing device to a first segment of said active subset by changing said action setting from Disable to Enable and transmitting said package of code;
    monitoring said installation to detect an anomaly among said set of metrics; and
    in response to detecting said anomaly, pausing installation of said feature from said first computing device to said first segment by changing said action setting from Enable to Pause and generating a repair ticket.

2. The method of claim 1, further comprising:
activating installation of said feature by changing said action setting from Disable to Enable for a subsequent segment of said active subset of said plurality of remote computing devices, iteratively, unless an anomaly is detected and until said feature is installed on substantially all devices in said active subset.

3. The method of claim 1, further comprising:
in response to detecting an anomaly among said set of metrics associated with said first segment, disabling installation of said feature from said first computing device by changing said action setting from Enable to Disable and generating a repair ticket.

4. The method of claim 1, further comprising:
uploading said feature from said first computing device across a network to an application distribution platform;
detecting from said application platform a quantity of installations of said feature; and
in response to said detected quantity reaching a threshold limit, executing said step of activating installation of said feature for said first segment of said active subset.

5. The method of claim 1, wherein said feature comprises a plurality of features, each comprising a rank, said method further comprising:
maintaining on said first computing device an ordered list of said plurality of features by rank; and
activating installation of said plurality of features, by said rank according to said ordered list, from said first computing device to said first segment of said active subset by changing said action setting from Disable to Enable and transmitting said package of code,
wherein said step of pausing installation further comprises activating installation of a subsequent feature, by said rank according to said ordered list.

6. The method of claim 1, wherein said set of metrics comprises a performance metric comprising:
a crash rate associated with said application;
an app-open latency associated with an instance of opening said application; and
a task latency associated with a duration between starting and completing a selected task by said application, wherein said selected task comprises a capture task and a send task.

7. The method of claim 1, wherein said set of metrics comprises an engagement metric comprising:
a session length associated with said application; and
a quantity of user actions performed by said application, wherein said user actions comprise creation actions and send actions.

8. The method of claim 1, wherein said set of metrics comprises a plurality of metric values, each associated with a stability threshold, and wherein said step of monitoring the installation further comprises:
determining for each metric value whether said associated stability threshold is exceeded.

9. A system for monitoring the staged release of a feature, the system comprising:
a first computing device in communication with a plurality of remote computing devices, said first computing device comprising a processor, a memory, and programming stored in the memory, wherein execution of said programming by said processor configures said first computing device to perform operations, including operations to:
maintain a feature associated with an application, wherein said feature comprises a package of code and an action setting, said action setting comprising an action selected from the group consisting of Disable, Enable, and Pause;
monitor an active subset of said plurality of remote computing devices running said application according to a set of metrics associated with said application;
activate installation of said feature from said first computing device to a first segment of said active subset by changing said action setting from Disable to Enable and transmitting said package of code;
monitor said installation to detect an anomaly among said set of metrics; and
in response to detecting said anomaly, pause installation of said feature from said first computing device to said first segment by changing said action setting from Enable to Pause and generating a repair ticket.

10. The system of claim 9, wherein execution of said programming by said processor further configures said first computing device to perform additional operations, including operations to:
activate installation of said feature by changing said action setting from Disable to Enable for a subsequent segment of said active subset of said plurality of remote computing devices, iteratively, unless said anomaly is detected and until said feature is installed on substantially all devices in said active subset.

11. The system of claim 9, wherein execution of said programming by said processor further configures said first computing device to perform additional operations, including operations to:
in response to detecting said anomaly among said set of metrics associated with said first segment, disabling installation of said feature from said first computing device by changing said action setting from Enable to Disable and, generating a repair ticket.

12. The system of claim 9, wherein execution of said programming by said processor further configures said first computing device to perform additional operations, including operations to:
upload said feature from said first computing device across a network to an application distribution platform;
detect from said application platform detecting a quantity of installations of said feature; and
in response to said detected quantity reaching a threshold limit, executing said step of activating installation of said feature for said first segment of said active subset.

13. The system of claim 9, wherein said feature comprises a plurality of features, each comprising a rank, and wherein execution of said programming by said processor further configures said first computing device to perform additional operations, including operations to:
maintain on said first computing device an ordered list of said plurality of features by rank; and
activate installation of said plurality of features, by said rank according to said ordered list, from said first computing device to a first segment of said active subset of said plurality of remote computing devices by changing said action setting from Disable to Enable and transmitting said package of code,
wherein said operation of pausing installation further comprises activating installation of a subsequent feature, by said rank according to said ordered list.

14. The system of claim 9, wherein said set of metrics comprises a performance metric comprising:
   a crash rate associated with said application;
   an app-open latency associated with an instance of opening said application; and
   a task latency associated with a duration between starting and completing a selected task by said application, wherein said selected task comprises a capture task and a send task.

15. The system of claim 9, wherein said set of metrics comprises an engagement metric comprising:
   a session length associated with said application; and
   a quantity of user actions performed by said application, wherein said user actions comprise creation actions and send actions.

16. The system of claim 9, wherein said set of metrics comprises a plurality of metric values, each associated with a stability threshold, and wherein said operation of monitoring said installation further comprises:
   determining for each metric value whether said associated stability threshold is exceeded.

17. A non-transitory processor-readable storage medium that stores processor-executable instructions that, when executed by a processor of a machine, cause said machine to perform operations comprising:
   on a first computing device in communication with a plurality of remote computing devices, maintaining a feature associated with an application, wherein said feature comprises a package of code and an action setting, said action setting comprising an action selected from the group consisting of Disable, Enable, and Pause;
   monitoring an active subset of said plurality of remote computing devices running said application according to a set of metrics associated with said application;
   activating installation of said feature from said first computing device to a first segment of said active subset by changing said action setting from Disable to Enable and transmitting said package of code;
   monitoring said installation to detect an anomaly among said set of metrics; and
   in response to detecting said anomaly, pausing installation of said feature from said first computing device to said first segment by changing said action setting from Enable to Pause and generating a repair ticket.

18. The non-transitory processor-readable storage medium of claim 17, wherein execution of said instructions causes said machine to perform further operations, comprising:
   activating installation of said feature by changing said action setting from Disable to Enable for a subsequent segment of said active subset of said plurality of remote computing devices, iteratively, unless said anomaly is detected and until said feature is installed on substantially all devices in said active subset.

* * * * *